(12) United States Patent
Pace et al.

(10) Patent No.: US 10,225,245 B2
(45) Date of Patent: Mar. 5, 2019

(54) IDENTITY INFRASTRUCTURE AS A SERVICE

(71) Applicant: Auth0, Inc., Redmond, WA (US)

(72) Inventors: Carlos Eugenio Pace, Redmond, WA (US); Matías Woloski, Buenos Aires (AR); José Fernando Romaniello, Córdoba (AR)

(73) Assignee: AUTH0, INC., Redmond, WA (US)

( * ) Notice: Subject to any disclaimer, the term of this patent is extended or adjusted under 35 U.S.C. 154(b) by 53 days.

(21) Appl. No.: 14/877,316

(22) Filed: Oct. 7, 2015

(65) Prior Publication Data

US 2016/0142399 A1    May 19, 2016

Related U.S. Application Data

(60) Provisional application No. 62/081,552, filed on Nov. 18, 2014.

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/10* (2013.01)

(58) Field of Classification Search
CPC ...... H04L 63/0815; H04L 63/10; G06F 21/53
See application file for complete search history.

(56) References Cited

U.S. PATENT DOCUMENTS

| | | | | |
|---|---|---|---|---|
| 6,651,168 | B1* | 11/2003 | Kao | G06F 21/32 713/155 |
| 7,428,750 | B1* | 9/2008 | Dunn | G06F 21/41 726/8 |
| 8,402,555 | B2† | 3/2013 | Grecia | |
| 8,533,860 | B1† | 9/2013 | Grecia | |
| 8,843,997 | B1 | 9/2014 | Hare | |
| 8,887,308 | B2† | 11/2014 | Grecia | |
| 9,197,644 | B1* | 11/2015 | Sherman | H04L 63/0807 |
| 9,268,933 | B2* | 2/2016 | Stecher | G06F 21/45 |
| 2003/0108161 | A1* | 6/2003 | Brown | H04M 3/436 379/88.01 |
| 2003/0145223 | A1 | 7/2003 | Brickell et al. | |

(Continued)

OTHER PUBLICATIONS

"International Search Report and Written Opinion" for PCT/US2015/061438, dated Feb. 2, 2016, 10 pages.

(Continued)

*Primary Examiner* — Techane Gergiso
(74) *Attorney, Agent, or Firm* — Han Santos, PLLC; Andrew J. Cameron

(57) ABSTRACT

A method and system of an identity service to provide a single point of access for a plurality of applications for an authentication of a user identity. An authentication request is received from an application via an application program interface (API), wherein the authentication request includes logon information. The authentication request is translated to one or more identity providers. Upon authentication, serially executing one or more programmatic extension scripts associated with the user. Privileges are granted to the user based on at least one of the programmatic extension scripts associated with the user.

26 Claims, 8 Drawing Sheets

(56) References Cited

U.S. PATENT DOCUMENTS

| | | | |
|---|---|---|---|
| 2003/0149781 A1* | 8/2003 | Yared | G06F 21/41 709/229 |
| 2004/0078373 A1* | 4/2004 | Ghoneimy | G06Q 99/00 |
| 2005/0044197 A1* | 2/2005 | Lai | G06Q 10/10 709/223 |
| 2005/0223217 A1* | 10/2005 | Howard | G06F 21/31 713/155 |
| 2006/0184657 A1* | 8/2006 | Rezvani | H04L 29/06 709/223 |
| 2006/0288404 A1 | 12/2006 | Kirshnan et al. | |
| 2007/0124490 A1 | 5/2007 | Kalavade et al. | |
| 2007/0208744 A1* | 9/2007 | Krishnaprasad | G06F 21/6227 |
| 2007/0277231 A1 | 11/2007 | Medvinsky et al. | |
| 2007/0289006 A1* | 12/2007 | Ramachandran | H04L 63/808 726/10 |
| 2008/0021997 A1* | 1/2008 | Hinton | H04L 63/0815 709/225 |
| 2008/0046984 A1* | 2/2008 | Bohmer | H04L 63/0853 726/5 |
| 2008/0263629 A1 | 10/2008 | Anderson | |
| 2009/0248883 A1* | 10/2009 | Suryanarayana | G06F 9/451 709/229 |
| 2009/0293117 A1 | 11/2009 | Yan et al. | |
| 2009/0300747 A1* | 12/2009 | Ahn | G06F 21/34 726/9 |
| 2010/0050251 A1* | 2/2010 | Speyer | G06Q 10/06 726/20 |
| 2011/0213688 A1* | 9/2011 | Santos | G06Q 30/04 705/34 |
| 2011/0225293 A1* | 9/2011 | Rathod | G06F 17/30867 709/224 |
| 2011/0321131 A1* | 12/2011 | Austel | G06F 21/33 726/4 |
| 2011/0321136 A1* | 12/2011 | Milman | G06F 21/6218 726/4 |
| 2012/0216244 A1* | 8/2012 | Kumar, Sr. | G06F 21/57 726/1 |
| 2012/0266229 A1 | 10/2012 | Simone et al. | |
| 2013/0205028 A1* | 8/2013 | Crockett | G06F 9/5027 709/226 |
| 2013/0340028 A1* | 12/2013 | Rajagopal | H04L 63/08 726/1 |
| 2014/0059658 A1* | 2/2014 | Stecher | G06F 21/45 726/5 |
| 2014/0136726 A1* | 5/2014 | Van Wie | H04L 12/00 709/231 |
| 2014/0298419 A1* | 10/2014 | Boubez | H04L 63/08 726/4 |
| 2014/0298442 A1* | 10/2014 | Qureshi | H04L 41/0816 726/8 |
| 2016/0087957 A1* | 3/2016 | Shah | H04L 63/205 726/1 |
| 2016/0149893 A1* | 5/2016 | Perrot | H04L 63/06 726/7 |

OTHER PUBLICATIONS

EP15860530 Supplementary European Search Report, (dated Mar. 23, 2018), 7 pages.

\* cited by examiner
† cited by third party

700
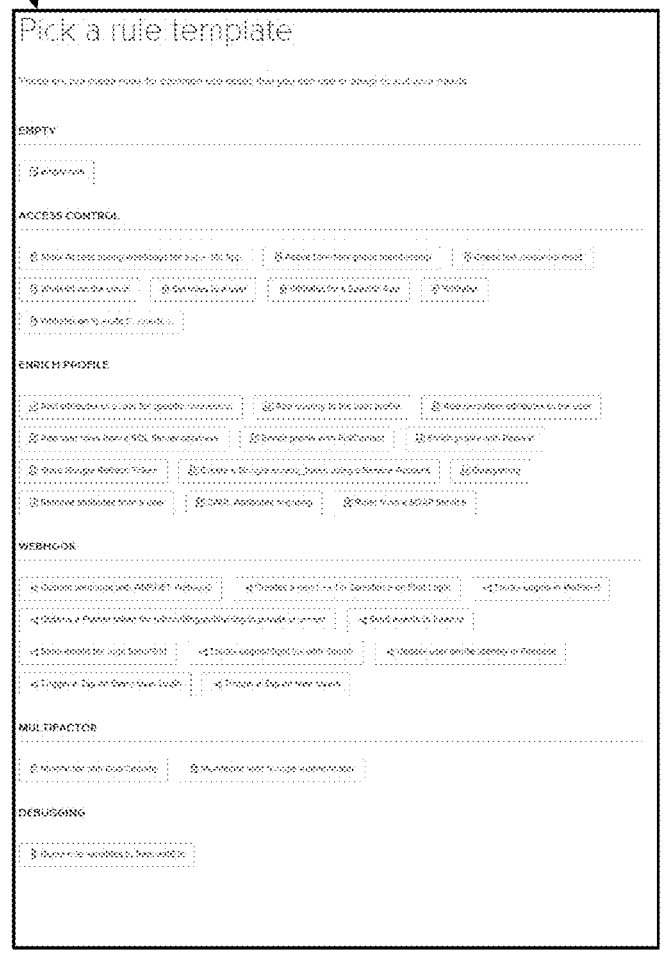
Figure 7

IDENTITY INFRASTRUCTURE AS A SERVICE

CROSS REFERENCE TO RELATED PATENT APPLICATION

This patent application claims priority from U.S. Provisional Application No. 62/081,552, filed Nov. 18, 2014, which application is hereby incorporated in its entirety by reference.

BACKGROUND

As computing power and ubiquity has been increasing, so too has people's reliance on computing, be it in the form of computer hardware, computer implemented services, or computer aided processes. As reliance on computing has increased, users of computing have come to apply computing to cover sensitive data and functions. Users routinely store private information, such as personal contact information, in their smart phones. Users rely on computerized functions, such as credit card transactions, without giving it a second thought. Indeed, the degree of integration is such that many users feel lost without their laptop, cell phone, or credit card, much as past users felt lost without their wallets or purses.

Unfortunately, this reliance on computing has created such a large store of sensitive data and functions that malicious third parties become attracted to, and attempt to access those data and functions. Some malicious third parties may simply seek to corrupt those data and functions. Others may come to steal. Accordingly, computer security systems have been developed to prevent unauthorized users from accessing sensitive data and functions.

Computer security systems are specific to a particular context. A context comprises the boundaries where a given security authentication mechanism is valid. Historically, the context has been that of a computer application. For example, a corporate user might have one password for their human resources application and another password for their accounting system. Thus, the context of the first password is that of the human resources application, and the context of the second password is that of the accounting system. Alternatively, the context may be that of a computer hardware platform such as a computing device or network. For example, logging onto a personal computer may provide access to personal applications on that computer that do not have application specific security. That personal computer may be authenticated by a network security service on a corporate local area network (LAN), such that networked drives, networked printers, and other networked computing assets may be made available to that authenticated personal computer.

However, the more sensitive the data or function, the more layers of security administrators add. Additional security has led to a proliferation of additional contexts and consequently a proliferation of authentication credentials corresponding to those additional contexts, all for a user to manage. For example, it is not unusual to require a password for network access, another password to access a corporate database on that same network, and an encryption key for an encrypted record on the corporate database, even though the same user is accessing that record from the that same LAN.

Presently, with the advent of the Internet hosted services, contexts associated with new application, and their specific credentials have also proliferated. Where once a user might need only to track their passwords for their personal home network, their work account, and their debit/credit card personal identification number ("PIN"), that user may now need to track individual accounts for different Internet services, each service representing a different security context. For example social networks (e.g. Facebook™), electronic mail services (e.g. Gmail™ or Hotmail™), and individual software services (e.g. Salesforce.com™) all have their own security contexts and therefore manage credentials separately.

Similarly, with the advent of mobile devices, new security contexts associated with computer hardware platform and their associated security credentials have proliferated. It is not unusual for a user to track passwords for work and personal computers, and lock codes for their cell phone and/or tablet device. In combination, the proliferation of software services and computer hardware platforms has resulted in a veritable explosion of security contexts.

This explosion of security contexts has created challenges for present day application developers. Users desire the implementation details of their computing resources to be abstracted away. Regardless if an application resides on a corporate network or is cloud based in the Internet, users desire a consistent user experience, and for disparate security mechanisms to be as integrated as possible, all without compromising security. For example, a user may wish to delegate authentication in an Internet application to their Facebook™ logon credentials. However, application developers are faced with the task with programming an authentication mechanism, integrating that mechanism with different contexts, and implementing on a wide variety of computing hardware and/or software platforms.

In sum, as software services and hardware platforms proliferate, application developers are spending increasing amounts of time on computer security at the expense of investing in developing compelling features for their applications. If the application developer does not create a compelling feature, users will not purchase the application. Yet, if the application is not secure, the users will still not purchase the application. Accordingly, there is a need, not addressed by the prior art, for an identity service to alleviate the aforementioned issues, and to provide computer security options not contemplated by the prior art.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

FIG. 7 is an illustration of an exemplary look and feel of a rules user interface used in identity infrastructure as a service.

DETAILED DESCRIPTION

Preliminary Concepts and Definitions

Figure 1:
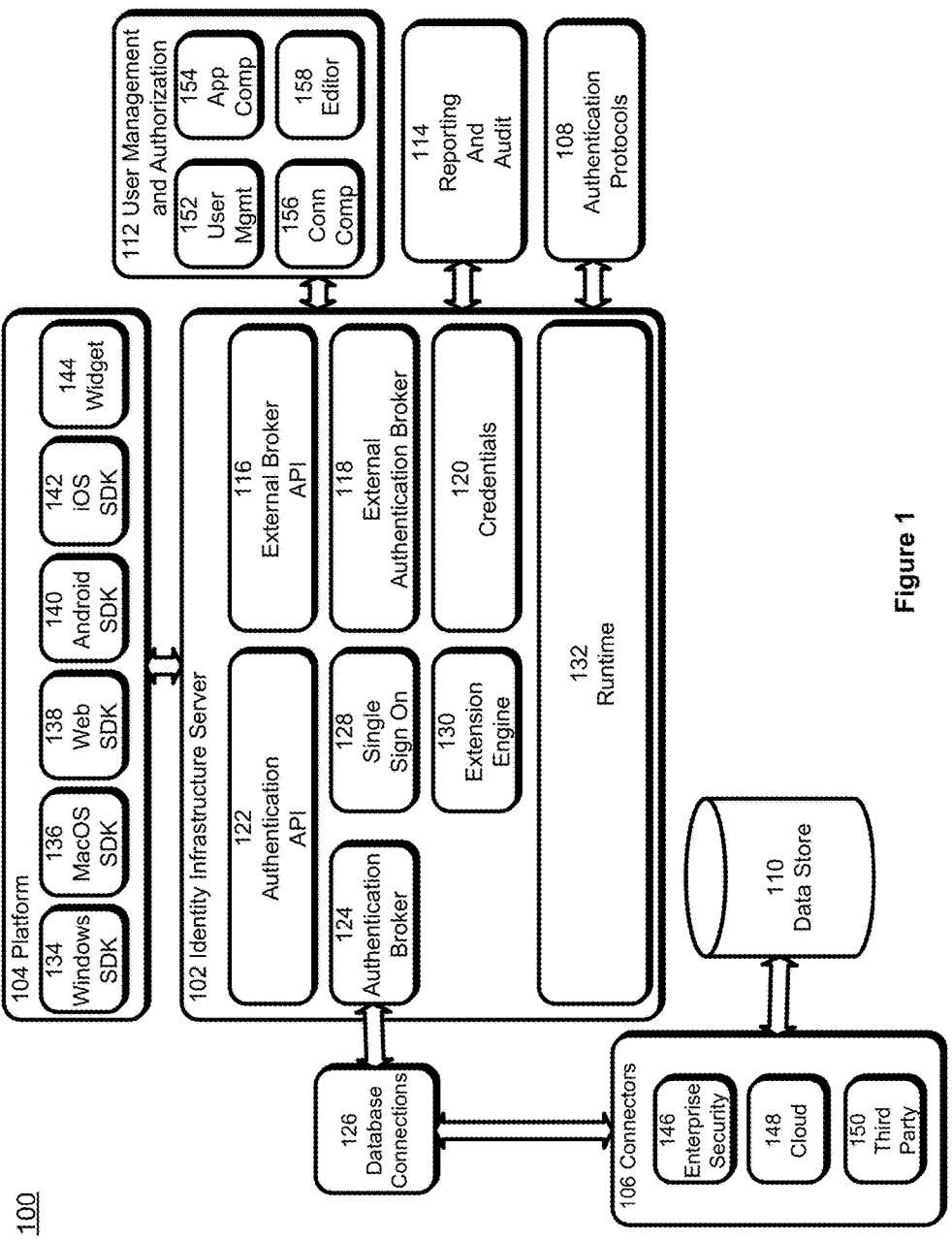
FIG. 1 is a top level context diagram for identity infrastructure as a service.

Presently, individuals, enterprises and other organizations, and nation states use computing, including computer hardware, computer implemented services, or computer aided processes, in almost every sphere of their operations. Reliance on computing has spread to cover sensitive data and sensitive functions, or data and functions that would cause harm to a user if other parties were to gain access. Individual users may use the computing capabilities of a smart phone to track phone numbers, electronic mail addresses and other contact information. Enterprise users, such as employees, may use a computerized payroll system to set and deposit salaries. Nation states may use computing for national defense and sensitive public infrastructure. Accordingly, any of those operations include sensitive data and sensitive functions, both of which any potential user of computers and/or computer aided/implemented services would seek to secure.

Computer security includes the notion of privacy, which is the securing of sensitive data. Protection may come in the form of preventing access to data designated as sensitive. For example, an individual user may have a bank account balance that he/she does not wish others to know. Accordingly, that individual may limit access to that bank account balance information to a specific individual, such as a spouse, or to a specific role, such as a bank employee. Protection may also come in the form of preventing data corruption. For example, an individual user may have a personal computer with personal schedule information. A malicious party may not be able to read that personal data, but instead may engage in malicious mischief and plant a computer virus to alter, delete, or otherwise corrupt the schedule information.

The notion of computer security also includes the securing of functions. As with securing data, securing functions includes both a user preventing other users from accessing or otherwise executing a sensitive computer function, and preventing malicious third parties from corrupting a sensitive computer function. An example of the former is an individual user seeking to prevent others from electronically withdrawing cash form his or her bank account. An example of the latter is a user adding a computer virus protection program to prevent a malicious third party from corrupting an application as to deny the individual user access to the services of that computer function.

As described above, privacy and securing functions comprise securing data and functionality, respectively. The scope of data and functionality that may be secured by a computer security mechanism is the security context for a computer security mechanism. In other words, a computer security mechanism has a domain of data and functionality where authentication and authorization by that computer security mechanism is trusted. The scope of the domain is the security context and leaving the security context is called crossing the trust boundaries of the security context.

Thus, effecting computer security for a security context includes the notions of authentication and authorization for that security context. Authentication is the verification of identity in an attempt to identify legitimate users and allow them to access secured data and/or functions. Credentials are a common way of authenticating users. Credentials may come in many forms. Authentication may be by possession of information, such as a securing user possessing a password. Authentication may be by possession of artifact, such as a security user possessing an artifact such as a key. A personal form of authentication by possession is via retina scans or fingerprint scans. Authentication may also be by behavior, such as a credit card company stopping purchases inconsistent with the credit card holder's previous purchases. In sum, authentication is the use of credentials to verify that a user is who that user claims to be.

Authorization is the allowing of access to secured data and/or computing functions in a given context after a successful authentication. As previously described above, authentication often is limited to verifying that a user is who he, she or it claims to be by virtue of possession of the expected credentials. Note that during authentication, a user need not be a person, but could also be a machine or a program. As with authentication, the security mechanism performing the authorization has a scope defined by a security context. Thus, on a practical basis, authorization often involves mapping users, once authenticated, to privileges to access secured data and/or computing functions. Authorization techniques include system administrator functions to grant privileges, creating and maintaining access control lists, and creating and maintaining access policies and rules. In sum, authorization is the issuance of privileges from one user, such as a system administrator, to another user. The context for authorization is often dynamic. What a given user can do, or the resources he could access might change based on time, behavior & location, for example. If a user accesses the same resource on unusual times of the day, he might be challenged to provide additional verification of who he claims to be. Likewise, if he's accessing from a network different from the one he usually is connected to.

Prior to authentication, computer security includes the actual securing of data and/or computing functions. Specifically, securing is the means used to prevent unauthorized access. Presently, securing data and/or computing functions makes use of cryptography. Cryptography is the transformation of data or functions into unintelligible or unusable form when accessed without a difficult to discover mathematical key, such as a long prime number. Present cryptographic techniques make use of one-way functions, so called because the computation of the function (i.e. encrypting) is relatively quick, but the computation of the inverse (i.e. decrypting) is extremely slow, to the point of taking years or centuries using conventional techniques without the mathematical key.

Accordingly, upon authentication, a user will be provided a key by a computer security system, thereby gaining access to secured data and/or functions that the user is authorized for. Thus, such a computer security system includes key generation, key distribution, and key management. Key generation is the creation of one or more keys for a cryptographic function. Symmetric cryptography, generally makes use of a single key that is kept secret and shared between parties. Asymmetric cryptography makes use of cryptographic functions, such as elliptical curves and modulus exponents include key pairs, where a first key is made publicly known for a first user to encrypt a communication to a second user, and a second key is kept secret by the second user and is used to decrypt the communication encrypted by the first user.

Both symmetric and asymmetric encryption rely on at least some generated keys being kept secret. Accordingly, key distribution relates to not only to distributing keys, but also to preventing keys from being intercepted by unauthorized and/or malicious parties. Key distribution techniques include protocols to ensure that only an authorized user receives a generated key. Since there is always the risk that a distributed key may be compromised, key management is the setting and implementing of policies of when and how to create, distribute and expire keys.

Where computer data and/or computer functions are sufficiently sensitive, eventually a computer security system will come under attack. Auditing is the detection of those attacks sufficient to allow for assessment of damage and developing a response. Auditing may be proactive, real-time or reactive. Proactive auditing may include the detection of probes by a malicious third party, testing computer security defenses. Real-time auditing may include the detection of an attack presently in progress. Reactive auditing may include the detection that an attack has occurred and further may include a damage assessment.

Identity as a Service

As described above, authentication is the verification that a user, human, machine or otherwise, is who he, she or it, claims to be, often by virtue of presenting expected credentials that can be validated. The confluence of the user and his/her/its respective credentials is that user's identity. The notion of identity is an abstraction encapsulating user security. Accordingly, identity management is a subset of computer security functions, including authentication, authorization, and audit, but not the underlying securing mechanisms, such as cryptographic infrastructure.

In one aspect, this patent application describes identity infrastructure services to support computer security functions for computer applications and devices in a wide range of security contexts. Specifically, identity infrastructure services enable the creation of an arbitrary security context for an arbitrary set of data and functions to be secured across multiple hardware and software platforms, using an arbitrary identity provider/security delegate or arbitrary set of identity providers/security delegates. Furthermore identity infrastructure services provide a way to programmatically control identity services, thereby allowing the scope and behavior of security contexts to be dynamic. Accordingly, identity infrastructure services expose application programming interfaces ("APIs"). Due to the centralized/aggregated nature of identity infrastructure services, often identity infrastructure services may be combined with or closely coupled with user management functions such as provisioning, de-provisioning, user validation and user profile. Specifically, user management is the management of user attributes which may or may not relate to security.

An advantage of developing identity as a service is that the trust boundaries of a security context are integrated together both from a user perspective and an administrative perspective. Prior art identity schemes cobbled together not only different authentication schemes, but also different services implemented in different locations. For example, from a user perspective, logging onto a corporate LAN and logging onto the local accounting system does not merely mean two separate logons. It means that the user had to cross trusted boundaries of at least one security context with each logon—logging onto the accounting system does not mean that you were trusted on the network and logging onto the LAN does not mean you were trusted on the accounting system. An administrator might have to perform hacks such as making an accounting administrative account on the LAN so that a user could access print and file services from the accounting system. From an administrative perspective, an administrator could not see the security status of accounts from the perspective of a single user. For example, if a hacker attempts to hack a user, an administrator might treat an attack on a user's LAN account and their accounting system account as two unrelated events, thereby slowing down detection and response to the hacking attack.

In one aspect, this patent application describes tools, libraries and other environmental elements to develop computer security functions programmatically via programmatic extensions comprising one or more extension scripts and/or other programs, and/or administratively via tools and other configuration mechanisms, for those security contexts. Furthermore, this patent application describes centralized services to support various identity management use cases.

FIG. 1 is a top level diagram 100 illustrating an exemplary embodiment of identity infrastructure services. The identity infrastructure services provide a single point to access identity and user management services. Specifically, diagram 100 illustrates an identity infrastructure server 102, integration with various development platforms 104, connections to various security delegates 106, access to various authentication protocols 108, storage for various credentials and authorizations 110, user management and authorization functions 112, and audit and analytic functions 114.

Identity Infrastructure Server

The identity infrastructure server 102 is a set of software services that provide a single point for application developers to access identity and user management services. Specifically, particular functions such as authentication, authorization and audit may be performed in the identity infrastructure server 102. The identity infrastructure server 102, thereby provides for the creation of any security context, across different data and functions, and using arbitrary identity providers.

Authentication may be performed natively by an identity provider, or may be delegated. When an identity provider is delegated to, it is known as a security delegate. The infrastructure server 102, exposes an enterprise external broker application programming interface ("API") 116 for authentication. The enterprise broker API 116 provides programmatic access to an external authentication broker 118, which implements the API calls into an authentication data format and/or protocol, such as Security Assertion Markup Language ("SAML"), WS-Federation, WS-Trust, OpenID Connect, OAuth1, OAuth2, or a complete custom credential store. In this way, the API provides a uniform programming interface while enabling the participation in a wide variety of authentication data formats and protocols, past, present and future.

Some authentication data formats and/or protocols contemplate local storage of user credentials 120. Alternatively, user credentials may be stored in a non-local storage 110.

The infrastructure server 102, also exposes an external authentication API 122 that provides programmatic access to various authentication techniques. Specifically, external authentication API 122 may access a local authentication broker 124, or may interface with a database connection 126, which in turn may call a variety of connections to various security delegates 106. Note that security delegates may be cloud services and other Internet hosted services. Alternatively, security delegates may be services hosted on a LAN. Since the external authentication API 122 has visibility to all brokers and delegates including the external broker 116, external authentication broker 118, and the authentication broker 124, it may implement single sign on functionality 128. Upon authentication, authorization is implemented via an authorization extension script engine 130. Further operation details of single sign on 128 and the authorization extension script engine 130 is provided with respect to FIGS. 3 and 4.

Implementation of the various components of the identity infrastructure server 102 may be executed on a runtime 132. The runtime may provide further security isolation. Security features of the runtime 132 are described in further detail with respect to FIG. 4.

Development Platforms

As described above, the identity infrastructure server 102 exposes a uniform API for identity management and user management functions, enterprise/LAN and external database/cloud services, and for a variety of protocols, data formats, and for a variety of identity providers and security delegates.

Similarly, on the client side, software development kits ("SDKs") 104 provide tools and libraries to access the APIs 116 and 122. The SDKs 104 serve to provide a uniform programmatic model to aid developers in supporting a wide variety of client platforms. Specifically, personal computer applications are supported by the SDK for the Microsoft Windows™ platform 134 or the SDK for Apple MacOS™ 136. Web Applications also have a specific SDK 138, as do mobile devices via the Android SDK 140 and the Apple iOS SDK 142.

Although each SDK 104 is specific to its underlying operating system/software platform, the SDK's are implemented consistently to ease application development for the different operating systems/platforms. One way to illustrate the benefits of this consistency is through semantically and syntactically similar libraries that perform the same function taking into account the idiosyncrasies of the underlying platform they run on. Another way of illustrating this benefit is through the JavaScript Login Widget 144, which provides a single body source code to provide a Login dialog for an arbitrary application capable of running JavaScript code. The operation of the JavaScript Login Widget 144 is described in further detail with respect to FIG. 5.

Connections for Security Delegation

The identity infrastructure server 102 typically does not implement security, but rather brokers security form identity providers and security delegates. Accordingly, it can expose native security through a native identity provider and provide interfaces with a wide variety of security delegates via connections 106. Connections can delegate to enterprise security 146, cloud services 148, or third party authentication providers 150.

Enterprise security connections 146 manage the interface to security servers typical on an enterprise on-premises network (LAN). For example, a Kerberos key server may be resident on the LAN domain. In order for the identity infrastructure server 102 to access the Kerberos based security server, it must locate and handshake with the Kerberos key server. This typically would be done via a domain directory service such as Microsoft Active Directory or a Lightweight Directory Access Protocol ("LDAP") service such as OpenLDAP. Upon a successful location and handshake with the security server, a user may be authenticated.

Cloud service connections 148 are connections to cloud services that provide for delegation to their authentication mechanism. For example, Facebook™ and Google Gmail™ both authenticate users. The cloud service connection 148 allows an application to access third party cloud applications via their respective API's in order to verify a user's identity.

Third party authentication provider connections 150 are connections to third party authentication providers who unlike cloud service connections do not communicate via Hypertext Transfer Protocol ("HTTP"). Examples include Verisign™ and U.S. Government specific authentication providers.

Authentication Services and Protocols

The identity infrastructure server 102 supports a wide variety of authentication protocols. Accordingly, the identity infrastructure server 102 may make use of outside components 108 supporting specific authentication protocols. For example OAuth2.0 may make use of a third party trusted server remote from the identity infrastructure server 102. In such scenarios, the identity infrastructure server 102 will interface with those third party components 108.

Credential Persistence

The identity infrastructure server 102 has an external persistence server 110 to store credentials, authorization extension scripts, metadata, and other data used in the operation of the identity infrastructure server 102. The persistence server may be, without limitation, a relational database management server ("RDMBS") or an object oriented database, a columnar database, or a NoSQL database.

Because the persistence server 110, may store sensitive information, such as credentials, the persistence server 110 may implement per record encryption.

User Management and Authorization Functions

The identity infrastructure server 102 is administered via a dashboard 112, which provides not only for identity management but for user management and authorization functions. Dashboard 112 includes user management functions 152 where user provisioning takes place. Application preferences may be set via application component 154. Connections may be added, deleted, edited or configured via connection component 156. An extension script editor 158 provides for the programmatic control of authorizations to users for application privileges via scripts interfacing with inputs and connections. The dashboard 112 is described in more detail with respect to FIG. 6.

The extension script editor 158 provides for very sophisticated logical and programmatic control over any resource accessible via the identity server and/or any resource on the client. Specifically, the extension script editor 158 supports the development of programmatic extensions comprised of one or more extensions scripts that may contextualize actions where privileges are enabled/disabled depending on the specific scope of a user's activity. Contextualized actions are described in more detail with respect to FIG. 3 and the extension script editor is described in more detail with respect to FIG. 6.

Audit Functions

Dashboard 112 also supports auditing and reporting functions 114. An administrator may review all activity relating to a user's identity, such as logon attempts, failed attempts, and applications accessed. The reporting functions aid in proactive, real-time and reactive audit via providing a wide variety of analytics functions and reports. The analytics functions and reports are described in more detail with respect to FIG. 7.

Exemplary Hardware Platform

Figure 2:
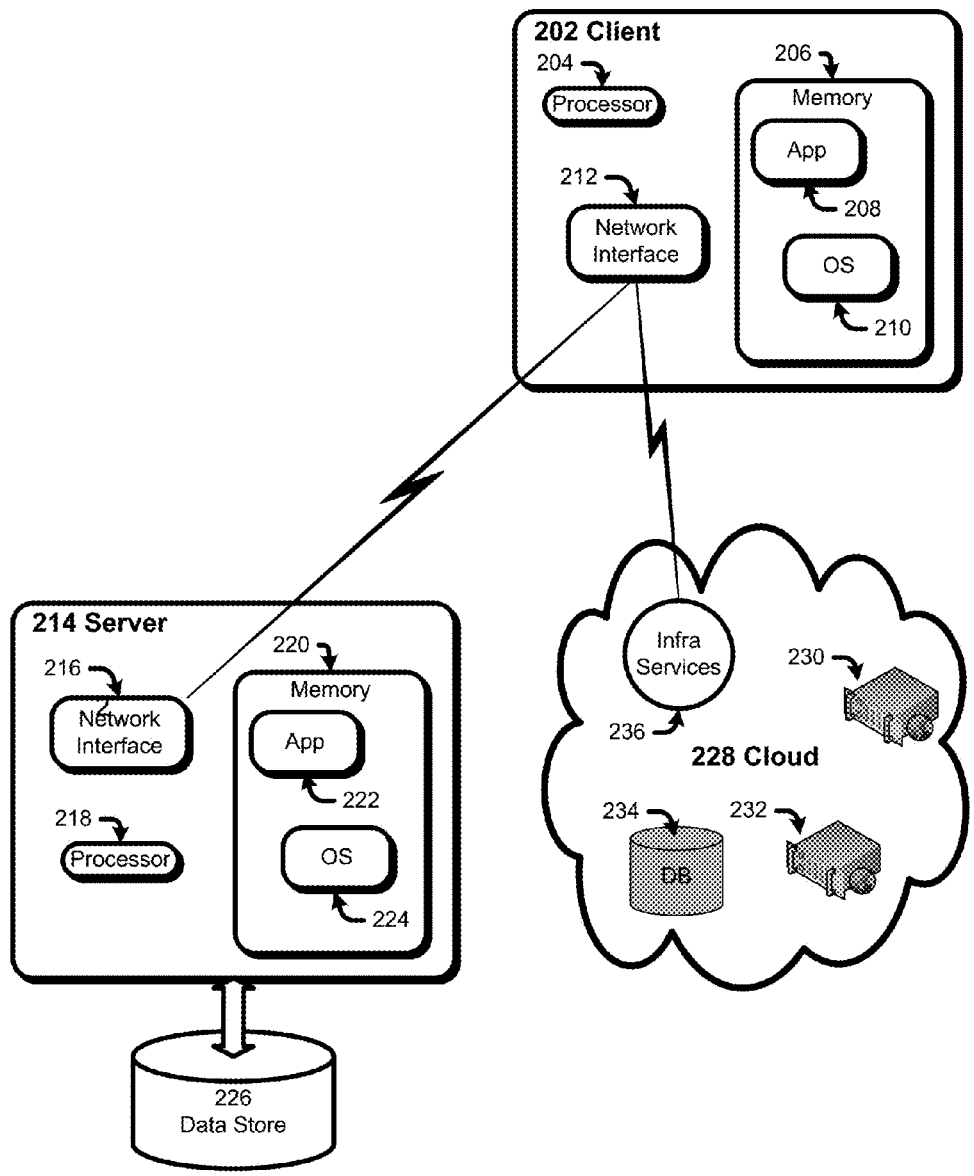
FIG. 2 illustrates an exemplary hardware and software platform for identity infrastructure as a service.

FIG. 2 illustrates one possible embodiment of a hardware environment 200 for automated porting of applications with semantic guarantees.

Client device 202 is any computing device. Exemplary computing devices include without limitation personal computers, tablet computers, smart phones, smart televisions, smart media players, and secure kiosks such as cash machines A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

Client 202 may communicate to a server 214. Server 214 is any computing device that may participate in a network. The network may be, without limitation, a local area network ("LAN"), a virtual private network ("VPN"), a cellular network, or the Internet. The client network interface 212 may ultimate connect to server 214 via server network interface 216. Server network interface 216 may be one or more network interfaces as described with respect to client network interface 212.

Server 214 also has a processor 218 and memory 220. As per the preceding discussion regarding client device 202, memory 220 is any computer-readable media including both computer storage media and communication media.

In particular, memory 220 stores software which may include an application 222 and/or an operating system 224. Memory 216 may also store applications 222 that may include without limitation, an application server and a database management system. Accordingly, server 214 may include a data store 226. The data store 226 may be configured as a relational database, an object-oriented database, a NoSQL database, and/or a columnar database, or any configuration to support scalable persistence.

The server 214 need not be on site or operated by the client enterprise. The server 214 may be hosted in the Internet on a cloud installation 228. The cloud installation 228 may represent a plurality of disaggregated servers that provide virtual web application server 230, 232 functionality and virtual database 234 functionality. Cloud 228 services 232, 234 may be made accessible via cloud infrastructure 236. Cloud infrastructure 236 not only provides access to cloud services 230, 232 but also billing services. Cloud infrastructure 236 may provide additional service abstractions such as Platform as a Service ("PAAS"), Infrastructure as a Service ("IAAS"), and Software as a Service ("SAAS").

Supporting Tools and Environment for Identity as a Service Overview

Identity as a service gives rise to advantages not provided in the prior art. Because identity and security functions are centralized, trust boundaries of security contexts are not crossed multiple times, thereby simplifying the integration of operation and reporting. The following describes selected components that comprise identity infrastructure as described with respect to FIG. 1.

Extension Script Engine

Authentication of a user has evolved from simple binary operations where a user is either authenticated for an entire system, or otherwise locked out of the system. Authentication can not only trigger to particular individual privileges to portions of a system, but also can be conditional. The encapsulation of the conditions to allow specific privileges for a particular portion of a system are called roles. For example, an administrator may have set up a role of temporary technician where access only to three particular machines is granted, and read-only privileges to certain files are granted.

Beyond roles, in identity as a service, programmatic extensions comprise one or more extension scripts. Programmatic extensions provide a general extension model. Programmatic extensions and their extension scripts can be applied to any programmatic purpose, security based, identity based, or otherwise. For example, a programmatic extension may trigger on the aggregation of non-security or non-identity based information, and/or non-security or non-identity custom APIs.

However, programmatic extensions may be extensively applied to security and/or identity contexts. Programmatic extensions enable contextualized authentication on a per application/per user basis. More specifically, identity services provide access to arbitrary data and functionality to be secured, such as access to applications and/or their respective APIs to be secured, network resources, and/or devices to be secured. A user may further create custom APIs to make an application and/or device accessible. Support for device accessibility may thereby enable securing elements of the "Internet of Things." Access to data and functionality may be secured via one or more identity providers and/or security delegates via one or more extension scripts comprising a programmatic extension. An extension script can thereby programmatically create an arbitrary security context. Accordingly, one or more extension scripts in combination may comprise a programmatic extension of identity services. Furthermore, because the programmatic extension is programmatic in nature, the scope and behavior of the created security context is dynamic. Since a programmatic extension's extension scripts have access to any input available to the identity server and the client, the scope and security context may change in response to any of those inputs.

A programmatic extension's extension script may bind to any identity, any constraint, whitelists of functions in modules, whitelists of uniform resource identifiers ("URIs"), and the like. All such resources may be programmatically controlled by an extension script in the creation and management of a security context. By way of example, consider a programmatic extension whereupon any logon by new customer is detected by a script and a record is created in a customer relations management ("CRM") application for an enterprise salesperson to follow up. Such functionality is an example of programmatically extending identity functionality with CRM functionality, all via a programmatic extension.

Figure 3:
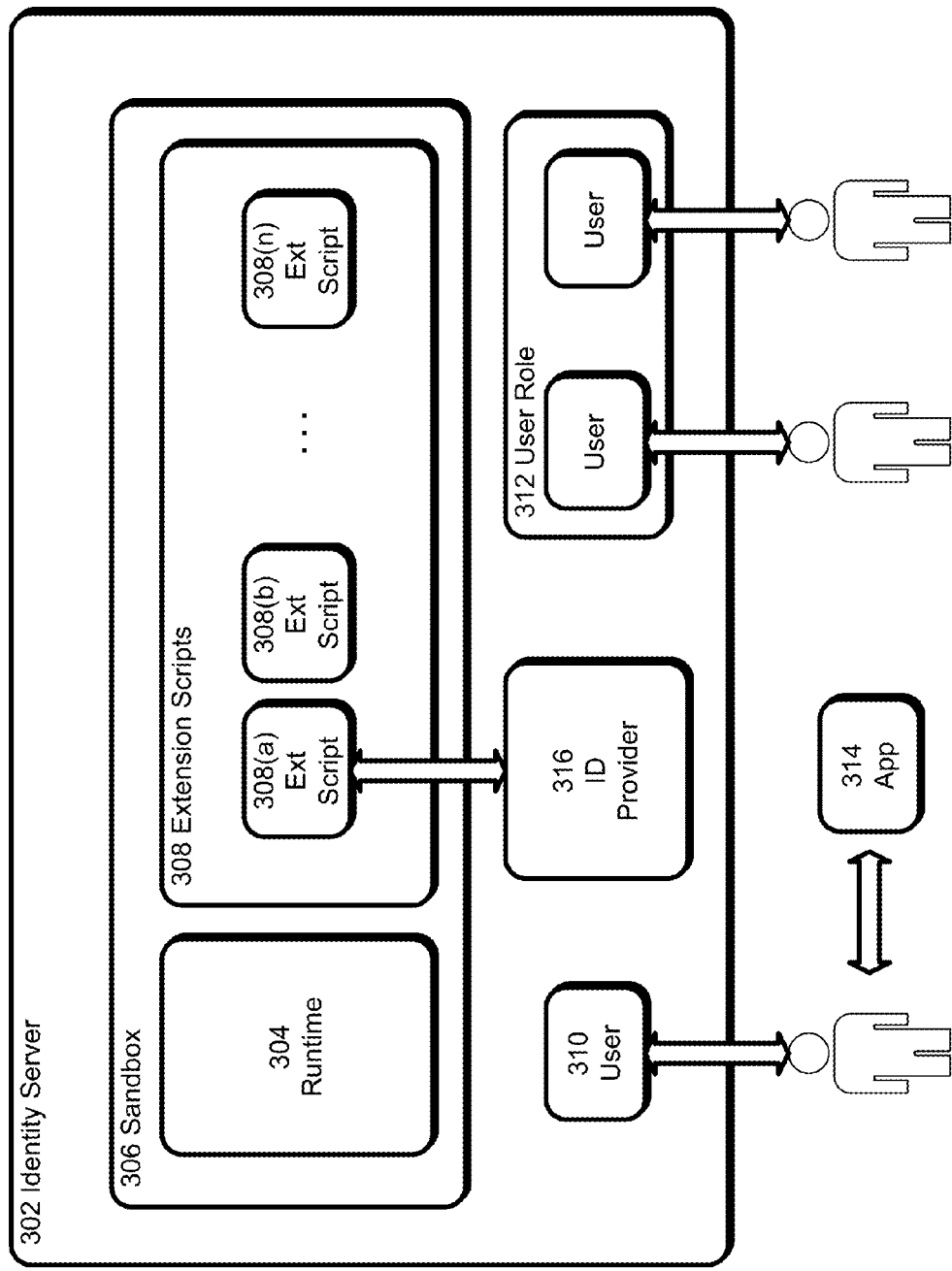
FIG. 3 is a diagram of an exemplary extension script engine for identity infrastructure as a service.

In identity as a service, security contexts created by a programmatic extension may apply to more than one system, and may apply to more than one identity provider and/or mechanism. Because of the centralization of the identity/security services of the system and different identity providers and/or mechanism, a single extension script may constrain an arbitrary service and/or mechanism. FIG. 3 is a diagram 300 illustrating the administration of extension scripts for one or more programmatic extensions and the execution of those extension scripts in an identity infrastructure.

An identity server 302 includes a runtime 304, and a sandbox 306. The runtime 304 and the sandbox are described in more detail with respect to FIG. 4. Extension scripts 308 comprise programmatic extensions of identity services that call application APIs, security APIs, APIs to identity providers, and any other API available to the identity server 302. Most notably, the extension scripts of a single programmatic extension could potentially call APIs from different applications, from different security mechanism, from different identity providers. Accordingly, extension scripts provide a mechanism to programmatically extend security services. To add a programmatic extensions, an administrator may program one or more extension scripts, where the extension scripts share a well-known namespace associated with programmatic extensions for the identity server 302. A programmatic extension's constituent extension scripts are then uploaded to identity server 302, usually in the identity server's local storage, but alternatively to a networked storage. Conversely, a programmatic extension may be removed by deleting its constituent extension scripts from the storage. An uploaded extension script 308 may be associated with a user 310 or a user role 312, i.e. a group of users with a set of privileges in common. An uploaded programmatic extension 308 may be configured to be active, or inactive. Accordingly, an programmatic extension 308 need not be deleted to be deactivated.

One example of the operation of an extension script is the association of a programmatic extension with a user and/or a role. In this example, a user 310 attempts to logon to an application 314. Application 314, then calls the identity server 302 via its API and sends the logon information in the form of an authentication request. The identity server 302 then translates the authentication request to requests to identity providers 316. Upon successful authentication by the identity providers 316, the identity server 302 then serially executes all extension scripts that have been associated with the user and/or the user's roles. Based at least on one of the programmatic extensions 308, the identity server will grant privileges accordingly. The application 314 is then notified of the granted privileges via the application API.

Users, User Profiles and Schemas

When a user logs in, a user logs in via a particular security mechanism for a particular security context. A user's state for logging in for that particular security mechanism and for that particular security context may be captured in a plurality of fields. Furthermore, additional fields that comprise a user's identity for that particular context may be associated with a user. The set of those fields comprise a user schema.

User schemas may have default fields such as username and password. However, user schemas may be further customized as described with respect to the dashboard below, or may be customized dynamically via programmatic extensions.

It is to be noted that users should not always be assumed to be persons. Rather, users may be other machines or programs that may have their own accounts. Accordingly the ability to customize schema statically and/or dynamically can enable managing profiles of very different types of users. For example, some classes of users, such as a person, may reasonably have first name and last name fields. Other classes of users, such as a machine may have a machine identifier field.

Runtime and Sandbox

Figure 4:
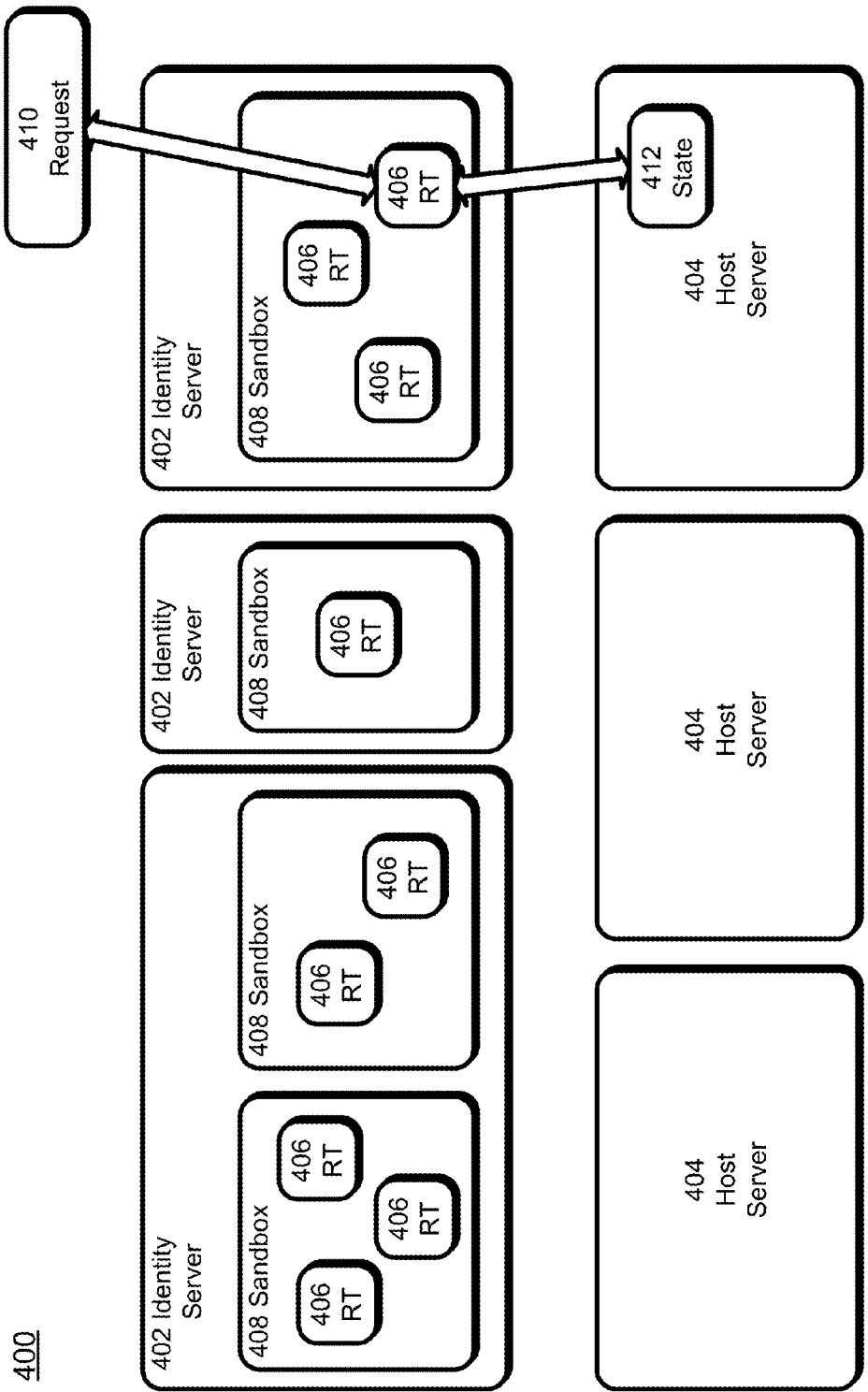
FIG. 4 is a diagram of an exemplary runtime for identity infrastructure as a service.

At least a portion of the identity server may executed in a sandbox, i.e., an isolated program execution area. FIG. 4, illustrates an exemplary context 400 of the identity server running in a sandbox. The sandbox is motivated by virtue of the extension script engine whose extension scripts constitute programmatic extensions of the identity services. Because the extension scripts have access to all identity and client resources, the sandbox may limit the scope of changes that may be performed by a programmatic extension's constituent extension scripts.

An installation of identity servers 402 may be deployed on multiple host servers 404, virtual or otherwise. On each host server 404, there may be one or more runtimes 406 and one or more corresponding sandbox 408 execution areas. The stateless portions of the identity server logic, for example programmatic extensions and connections, may be copied to the different hosts. Thus, when a request 410 comes to the installation, it may be dispatched to the first available server, thereby aiding scalability. Stateful, or persistent portions of the identity server logic may be stored on a server 412 with a mutually accessible data store or database. Since authentication requests are unique to a user, an administrator may opt to partition the data store into multiple servers where the records are partitioned by user. Identity servers 402 may optionally failover to each other. In one embodiment, one identity server instance could be on-premises and another identity server instance could be off-premises. By programmatically scripting conditions as to which identity server to use, roaming could be implemented via an extension script of a programmatic extension.

Login Widget

Figure 5:
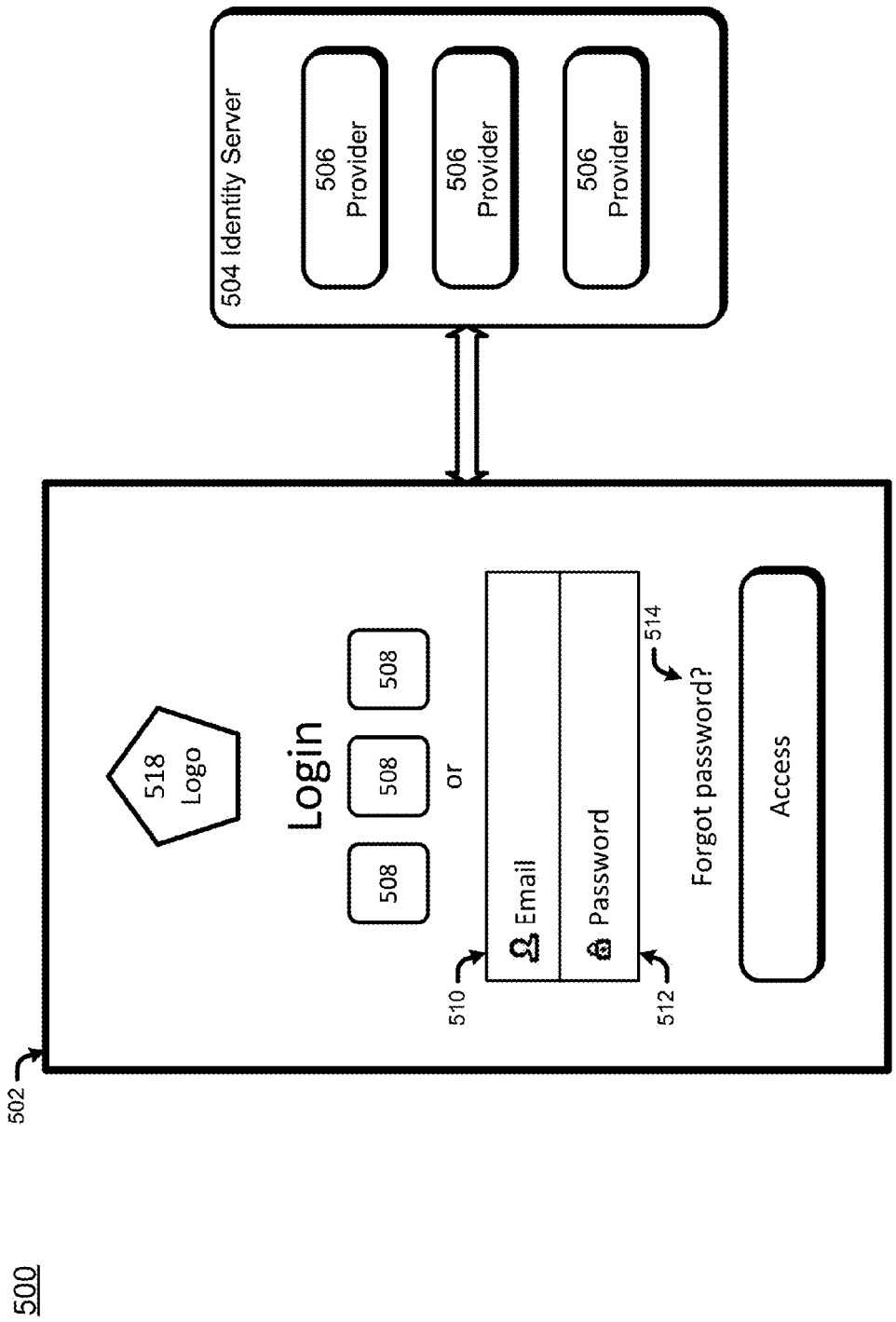
FIG. 5 is an illustration of a login widget used in identity infrastructure as a service.

A common difficulty for application programmers is developing a logon dialog box. In the past, each application involved a custom built dialog, one for each permutation of application and identity provider. The advent of open authentication protocols simplified the process, provided that one and only one authentication protocol was used. However, with identity as a service, multiple authentication protocols and multiple identity providers may be accessed by an application. This makes possible a universal login widget. FIG. 5 is an illustration 500 of a universal login widget.

Login widget 502 is a dialog box that may be implemented by cutting and pasting a small code snippet into an application. In the code snippet, the login widget may be customized as described in this subsection. The login widget 502 calls identity server 504, and based on its configuration, may avail itself to one or more connections to identity providers 506. For example, Login widget 502 contains links 508 to authentication via third party authentication services, such as Google+™, Facebook™, and Twitter™ (not shown). Because of the centralization of identity providers 506 via the identity server 504, login widget 502 may access more than one identity providers 506 merely by changing attributes of the login widget.

Login widget 502 also contains a user/password logon comprising a user name text box 510, password text box 512 and a logon button 514. As with the connections, attributes can control the display and logic of the login widget 502. If there is an enterprise connection configured, the user name text box 510 will configure to receive an electronic mail address. If there is a database connection, the password text box 512 will automatically display, and optionally a signup/ forgotten password link 514. Clicking the link 514 will open a web session where a user may sign-up to a service and/or reset a password. In general, the login widget 502 includes logic to determine which fields to display, or what behavior to exhibit, based on either on attributes or on the type of connection.

Login widget 502 may include logic to populate the schema fields for that user's profile. Login widget 502 may also trigger a programmatic extension. For example, there may be a programmatic extension that upon logon populates the user's profile. One of the fields in the profile may be populated from external data and may determine that the user satisfies certain criteria. The programmatic extension, upon determining that the criteria is satisfied, may send an automated e-mail message to the user. A specific example may be a customer relations management programmatic extension that determines that a new user has been added via the login widget 502, which then sends a greeting/follow-up e-mail to the new user encouraging the new user to make use of particular application features.

Login widget 502 also includes a brandable title bar 518 where a custom title and/or logo may be displayed, simply by setting an attribute.

Connections

The identity server provides a rich extensibility model. The identity server presents a consistent API to applications regardless of the connection type of the identity provider. For example, regardless whether a social network provider such as Facebook™ is invoked, or the local LAN via Windows™ Authentication, an application may rely on simply calling the identity server API. This extensibility is made possible via a set of connections.

Each connection contains an implementation of the identity server API in terms of the APIs presented by a particular identity provider and/or an identity provider's protocol. Accordingly, the identity server API provides a mechanism to quickly implement new connections to new identity providers and/or security delegates. In some cases, a connection may have to rely on a server other than the identity server or other external information to provide information and/or functionality. For example, some OAuth authentication scenarios may make use of a third-party provider.

Connections are registered to the identity server and may be enumerated programmatically through an API. To call a connection programmatically, the code enumerates the connections or otherwise searches for the connection. Upon obtaining a handle to the connection, the code may then invoke the standard functions via the identity server API.

Dashboard

Figure 6:
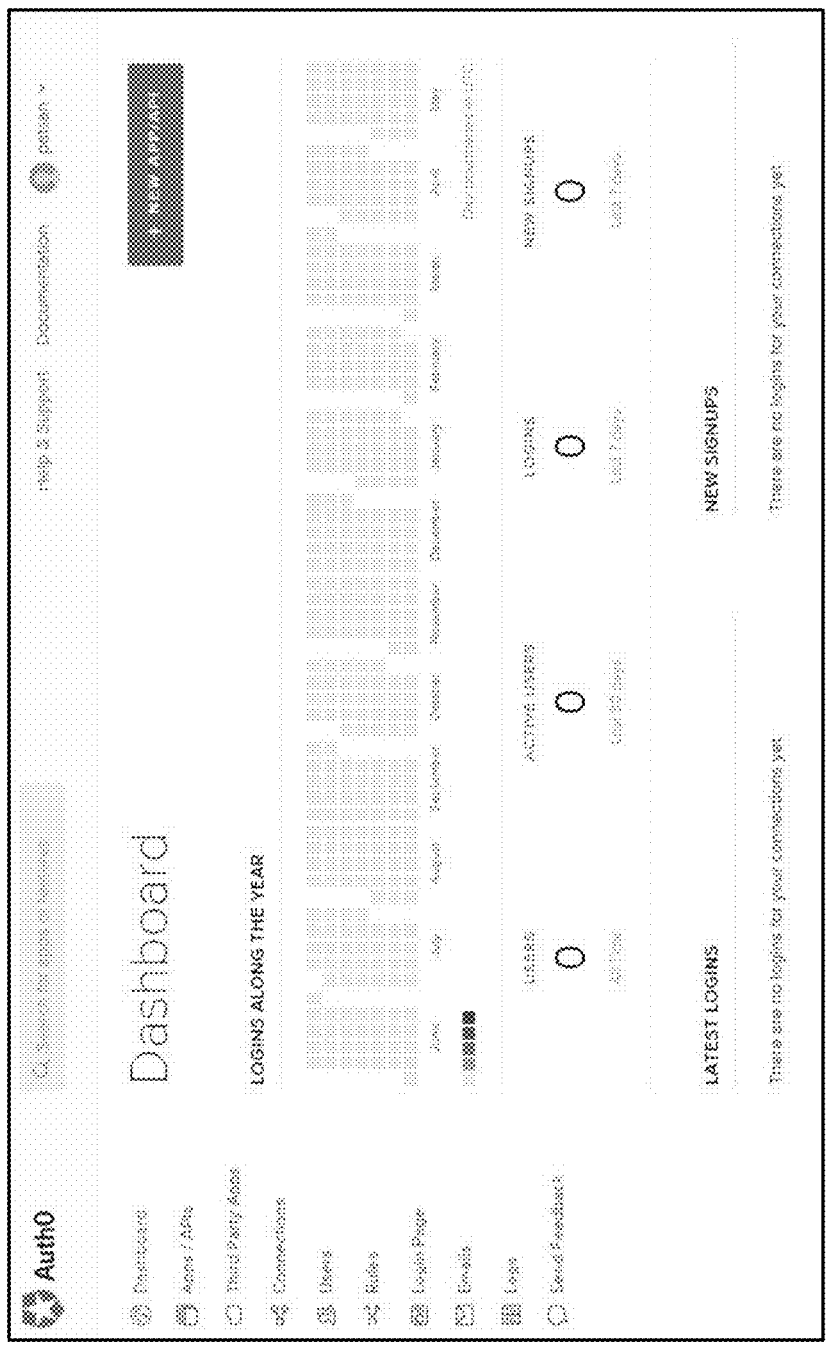
FIG. 6 is an illustration of an exemplary look and feel of a dashboard user interface used in identity infrastructure as a service.
Figure 8:
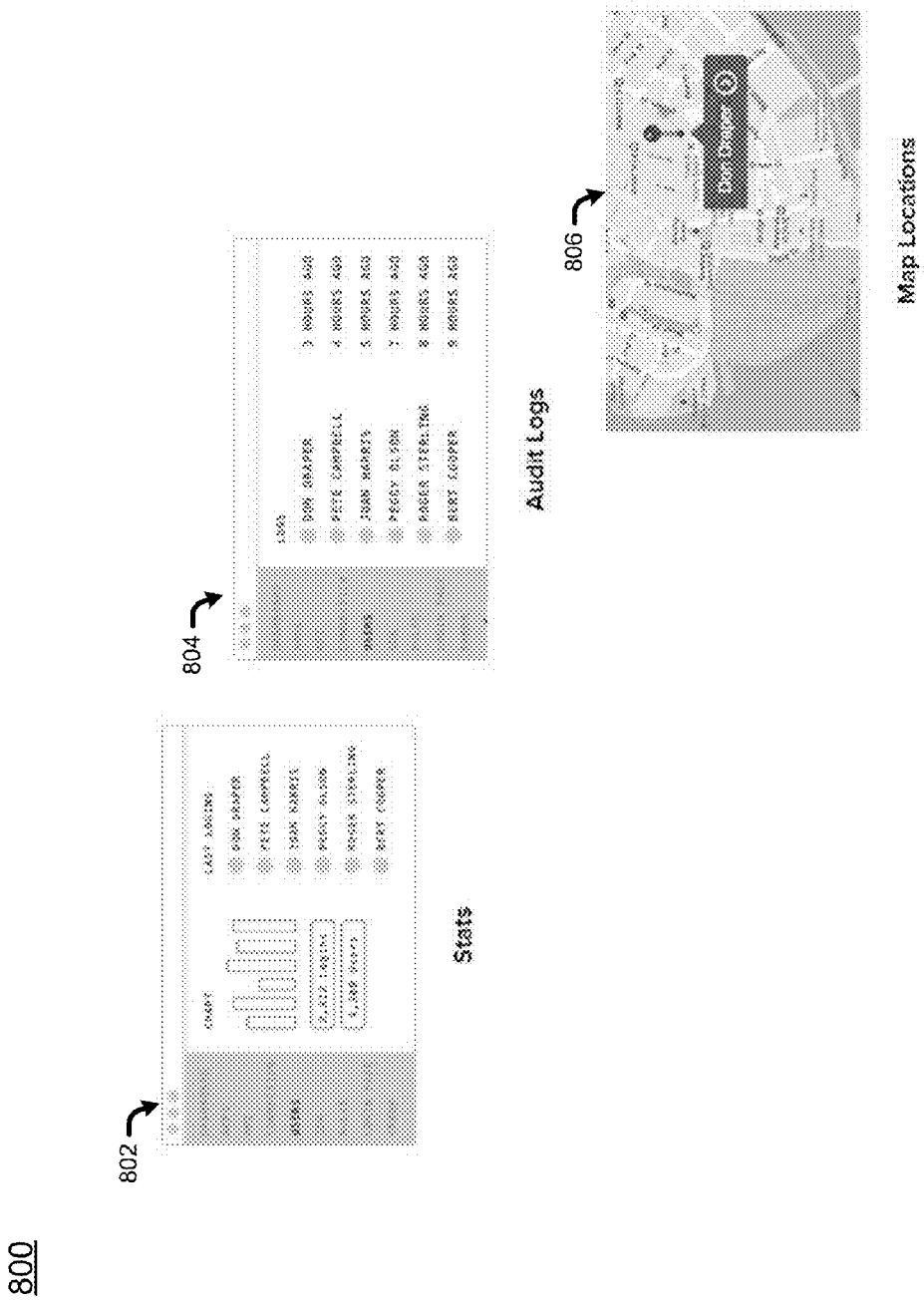
FIG. 8 illustrates some exemplary analytics reports in the context of identity infrastructure as a service.

Administrators have access to a centralized dashboard with which to administer the core capabilities of the identity server. Specifically, an administrator may add multiple connections to identity providers, multiple applications, multiple users, and multiple programmatic extensions, and associate together. For example, an identity provider connection to Gmail™ may be associated with two applications such that those applications use Gmail™ authentication for their authentication scheme. Users may be associated with roles. Users and/or Role may be given privileges to particular applications. Privileges may be constrained according to programmatic extensions, as described above. The top level view of an exemplary dashboard 600 is shown in FIG. 6 and a rules editor user interface 700 is shown in FIG. 7.

The dashboard has an extension script editor 702 by which to create programmatic extensions to identity services. Extension scripts comprising a programmatic extension may be programmed from scratch, or the extension script editor 702 may provide templates 704 to be modified, or wizards which dynamically help a user through each step of creating an extension script for a programmatic extension. In addition to drafting scripts in the extension script editor 702, an administrator may test and/or debug the extension scripts in the extension script editor 702 that were programmed prior to upload. In this way, the extension script editor 702 may be considered to be an integrated development environment for programmatic extensions and their constituent extension scripts.

In deployment, the extension script is included in the extension script namespace and the extension script invoked upon receiving a user input, such as a button press, from the extension script editor 702. The extension script editor will show whether a specified user was authenticated and which privileges were granted in the case of authentication. In this way, an extension script may be tested and debugged prior to deployment.

The dashboard 600 also may perform user management. For example, from the dashboard 600, an administrator may edit user information, may extend out user profile schemas that define fields in a user profile for a particular security context, may send notifications, may enable authorized impersonation of a user to provide for security delegation, and may provide for role management, group management and application management. Furthermore, applications may be customized from the dashboard, such as customizing the look and feel of applications, such as for the login widget, as well as potentially customizing application programming interfaces and associated programmatic notification events to access identity services for applications.

Exemplary Use Cases for Identity as a Service

Overview

The following subsections describe some use cases made possible by the centralization of identity and/or security services with identity as a service.

On-Premises/Off-Premises Symmetric Deployment

As previously mentioned, a consequence of the prior art, was that each identity provider was in its own silo. Whenever an application outside of the context of the identity provider was accessed, a separate logon was presented, with its own set of credentials. An extreme example would be on-premises authentication such as enterprise authentication and off-premises authentication such as from a web service. From a developer's perspective, each identity provider and application permutation might receive its own custom authentication code base. Furthermore, because off-premises was traditionally seen as less secure than on-premises, off-premises code tended to be more restrictive and more heavyweight.

However, with identity as a service, the implementation of security is abstracted away underneath the identity server API. Accordingly, the code base for an application need not change when porting from on-premised to off-premises. This scenario is common where legacy enterprise applications are being ported to the public cloud.

Just as the login widget code base is reusable, only with attributes and container code changing, an application may deploy with minimal code change. Specifically, the authentication portion of an application may merely use the login widget code. Alternatively, the authentication portion of an application, if it was written previously to the identity server API, may simply have its attributes changed with no code based change. Finally, a complex legacy code base for authentication may be replaced by code delegating authentication to the identity server, and any specified identity providers. In this way, porting may focus on application logic, rather than authentication logic.

A consequence of having identity provider uniformly accessible from a central identity server is that an application that is in the public cloud, may still be authenticated with enterprise credentials. This is because the application, even though it is in the public cloud, still calls the identity server for authentication. If the identity server has a connection to the on-premises enterprise identity provider, then the application may still authenticate with the enterprise identity provider, even though it is in the public cloud.

Customized Signup

As described above, the login widget provides an attribute, which when set provides a web link to signup for a web service, or to reset the password. Since the signup/reset password function is being performed outside the context of the login widget and the identity server, it may be difficult to obtain additional data/metadata about the signup/reset password function.

However, since the identity server provides a well-known location for identity data, a signup/reset password web page may be implemented with HTML fields containing the custom fields to be captured. The login widget may be added to the signup/reset password HTML page as with an ordinary application, and writing a script to send the additional fields to the identity server. By binding the script to the submit event, the additional fields, upon population, and an input event (e.g., submit button press) may have those corresponding values sent to the identity server. The identity server in turn parses the data, and associates the additional fields with the authentication record. For example, the data may arrive in the form of a JSON record, where the fields include the user's email and password. After parsing, the identity server may associate the additional fields to that email and password combination.

Payment

By virtue of centralizing authentication and identity functions, pay per use logon and per authentication schemes become possible. For example, an application may have some users logon via Gmail™ and others via FaceBook™. If a developer has an application that charges on a per use basis, or other constrained basis (e.g. by time such as a monthly subscription) a rule may be implemented to write a billing record for future invoicing upon logon. Alternatively, a separate billing application may query the identity server to enumerate billable instances of a user logging on in order to prepare in invoice.

Alternatively, an identity provider may monetize its access by implementing a rule at the identity server to write a billing record whenever that identity provider is accessed. Otherwise a separate billing application may query the identity server to enumerate billable instances of a user logging on via that identity provider, and may prepare an invoice accordingly.

Single-Sign On

The identity server provides for different cardinalities between applications and identity providers. Accordingly, single-sign on ("SSO"), where a plurality of identity providers delegate to a single identity provider, is a natural scenario for an identity server. SSO may be conceptualized reducing multiple applications with multiple identity providers to the multiple applications to one identity provider.

Beyond prior art SSO, SSO through an identity server provides for SSO via multiple identity providers, regardless whether they are on-premises or off-premises. Specifically, an administrator may specify a particular identity provider, such as the enterprise provider as the SSO, and set rules to provide allow authentication via other identity providers, if enterprise authentication (or the specified SSO identity provider) authenticates.

Linking Accounts

Linking accounts is where a user in a single app, may authenticate using different identity providers at different times. Thus, linking accounts may be conceptualized as having a cardinality of a single application with multiple identity providers. Specifically, a user will logon to an application using a first identity provider. The user might then step away from the application and the application lock upon timing out. The user may then logon to the application again using a second provider. Since the authentication is abstracted by the same identity server, the application may feel free to restart the application session from where the user left off, thereby providing a seamless transition.

Multifactor Authentication

Because an identity server has access to multiple identity providers, an application may make use of multifactor authentication. Multifactor authentication is where the logon process makes use of two or more factors. The idea is that a user who present multiple credentials is more secure than a user that presents a single set of credentials, because it is more difficult to hack multiple credentials than one set of credentials.

In multifactor authentication, a logon dialog is presented. The user enters first credentials for an identity provider. Upon success, the user is prompted to enter a second set of credentials. The logon dialog may change appearance to indicate success or failure of the first authentication attempt, and may remove any prompts from the first authentication attempt. The user may then enter the second credentials. Upon successful authentication, and subject to any applicable rules, the user receives his or her privileges.

For example, the user may be offered a logon dialog showing a Facebook™ connection icon and a Gmail™ connection icon. The user will enter their Facebook™ credentials. If successful, the user will be offered a logon dialog with only the Gmail™ connection icon showing. Upon successfully entering Gmail™ credentials, the user receives their privileges. Note that in this example, both credentials were off-premise credentials. Alternatively, a dialog providing both on-premises and off-premises identity providers could have been offered as well.

Owner User Management Functions/Audit

A centralized identity server has access to authentication records for both on-premises and off-premises authentication. Accordingly, an administrator may review analytics charts for authentication activity across a plurality of applications, a plurality of identity providers, regardless of whether they are on-premises or off-premises. FIG. 7 provides some exemplary analytical reports. Statistics report 702 illustrates a report of which applications are most frequently used, and by whom. Accordingly, this report may be used for usage behavior studies, potentially for directed advertising. Audit report 704 enumerates failed logon attempts. Since multiple identity providers are reported on, an administrator may detect which identity providers are attacked the most, and which identity providers are potentially the weakest. Reports may be in the form of maps. The Map Locations Report 706 provides a map of the locations of logons attempts. Where logon attempts are in unexpected locations, such as far away from the office and/or a user's known residence, an administrator may determine whether to infer suspicious activity.

CONCLUSION

Although the subject matter has been described in language specific to structural features and/or methodological acts, it is to be understood that the subject matter defined in the appended claims is not necessarily limited the specific features or acts described above. Rather, the specific features and acts described above are disclosed as example forms of implementing the claims.

What is claimed is:

1. An identity service system configured to provide a single point of access for a plurality of applications for an authentication of a user identity, the system comprising:
at least one authentication broker;
at least one application programming interface (API) configured to provide programmatic access to the at least one authentication broker;
one or more database connections coupled to the at least one authentication broker;
a plurality of security delegates connected to the database connections;
a data store coupled to the plurality of security delegates and configured to store one or more extension scripts, the data store being accessible by each of the plurality of security delegates, wherein the identity service system is further configured to:
receive an authentication request from an application via the at least one API, and
translate the authentication request to one of the plurality of security delegates via the one or more database connections, wherein translating the authentication request comprises implementing an API call into at least one of a plurality of available authentication protocols provided by the at least one API based at least on one or more attributes included in a login widget of the application that generated the authentication request and based on an authentication protocol of the one of the plurality of security delegates.

2. The system of claim 1, wherein an extension script further comprises one or more executable code segments that, when executed, contextualize actions where privileges are enabled or disabled depending on a scope of user activity.

3. The system of claim 1, wherein an extension script further comprises one or more executable code segments that, when executed, call multiple application program interfaces.

4. The system of claim 1, wherein the at least one API is configured to provide a single sign-on function via a logon widget.

5. The system of claim 1, wherein an extension script is associated with a user.

6. The system of claim 1, further comprising an extension script engine operative to provide an authorization upon an authentication of the user.

7. The system of claim 6, wherein the one or more extension scripts in combination comprise a programmatic extension of identity services.

8. The system of claim 1, further comprising a runtime operative to provide additional security isolation and to execute the functions of at least the at least one API and the at least one authentication broker.

9. The system of claim 8, further comprising a sandbox operative to limit a scope of changes that can be performed by the one or more extension scripts.

10. The system of claim 1, further comprising software development kits (SDK's) on a client side, configured to provide at least one of (i) tools and (ii) libraries to access the at least one API, wherein the tools of the SDK's include a login widget, operative to provide a single body source code for a login dialog for an arbitrary application running JavaScript code.

11. The system of claim 1, an extension script is associated with a user role.

12. The system of claim 1, wherein an extension script is configurable to be active or inactive.

13. The system of claim 1, wherein the one or more extension scripts further comprises one or more executable code segments that are executed upon receipt of a user authentication.

14. A method of providing an identity service to provide a single point of access for a plurality of applications for an authentication of a user identity, the method comprising:
receiving an authentication request for the user from an application from the plurality of applications via an application program interface (API), wherein the authentication request includes logon information;
translating the authentication request to one of multiple identity providers via a security delegate selected from a group of security delegates available through the API, each security delegate having access to a mutually accessible data store that stores extension scripts that control access to various services based on an identity of a user, wherein translating the authentication request comprises implementing an API call into at least one of a plurality of available authentication protocols provided by the API based at least on one or more attributes included in a login widget of the application that generated the authentication request and based on an authentication protocol of the one of the multiple identity providers;
upon authentication by the one or more identity providers, serially executing one or more programmatic extension scripts associated with the user;
granting privileges to the user based on at least one of the programmatic extension scripts associated with the user.

15. The method of claim 14, further comprising notifying the application of the granted privileges for the user.

16. The method of claim 14, further comprising limiting a scope of changes that can be performed by the one or more programmatic extension scripts by executing the one or more programmatic extension scripts in a sandbox.

17. The system of claim 14, further comprising billing the user for each authentication request.

18. The system of claim 14, further comprising providing a single-sign on (SSO) via the one or more identity providers regardless whether the user is on premises or off-premises.

19. The method of claim 14, wherein the plurality of available authentication protocols provided by the API comprise at least two authentication protocols selected from the group consisting of: Security Assertion Markup Language (SAML), WS-Federation, WS-Trust, OpenID Connect, OAuth1, and OAuth2.

20. The method of claim 14, wherein the one or more programmatic extension scripts associated with the user are configured to apply to more than one identity provider.

21. An identity server configured to provide a single point of access for a plurality of applications for an authentication of a user identity, the identity server comprising:
a processor;
a storage device for content and programming; and
a program stored in the storage device, wherein execution of the program by the processor configures the identity server to perform acts comprising:

receiving an authentication request for the user from an application from the plurality of applications via an application program interface (API), wherein the authentication request includes logon information;

translating the authentication request to an identity provider through one of multiple security delegates that are associated with at least one of: (i) an enterprise security provider, (ii) a cloud service provider, and (iii) a third-party provider, wherein the multiple security delegates have mutual access to a common data store, wherein translating the authentication request comprises implementing an API call into at least one of a plurality of available authentication protocols provided by the API based at least on one or more attributes included in a login widget of the application that generated the authentication request and based on an authentication protocol of the one of the multiple identity providers;

upon authentication by the identity provider, serially executing one or more programmatic extension scripts associated with the user;

granting privileges to the user based on at least one of the programmatic extension scripts associated with the user.

22. The identity server of claim 21, wherein execution of the program further configures the identity server to perform acts comprising limiting a scope of changes that can be performed by the one or more programmatic extension scripts by executing the one or more programmatic extension scripts in a sandbox.

23. The identity server of claim 21, wherein execution of the program further configures the identity server to perform acts comprising billing the user for each authentication request.

24. The identity server of claim 21, wherein execution of the program
further configures the identity server to perform acts comprising providing a single sign on (SSO) via the identity provider regardless whether the user is on-premises or off-premises.

25. The identity server of claim 21, wherein execution of the program further configures the identity server to perform acts comprising additional security isolation and execution of the functions of at least an enterprise broker API, an external authentication broker, and an authentication broker, via a runtime.

26. The identity server of claim 21, wherein execution of the program further configures the identity server to perform acts comprising limiting a scope of changes that can be performed by the at least one or more programmatic extension scripts associated with the user, via execution of the one or more programmatic extension scripts associated with the user in a sandbox.

* * * * *